United States Patent

[11] 3,626,930

[72] Inventor Irwing N. Toftness
 1425 2nd Ave., Cumberland, Wis. 54829
[21] Appl. No. 885,150
[22] Filed Dec. 15, 1969
[45] Patented Dec. 14, 1971

[54] LENS RADIATION COLLECTING AND SENSING DEVICE
 7 Claims, 4 Drawing Figs.
[52] U.S. Cl. .................................................. 128/2 H, 350/2
[51] Int. Cl. .................................................. A61b 06/00
[50] Field of Search .................................. 128/2, 2 H, 2 R; 350/2

[56] References Cited
 UNITED STATES PATENTS
 1,648,899  11/1927  Hayman ....................... 128/2 R
 3,269,173  8/1966  Von Ardenne ................ 128/2 UX
 3,439,969  4/1969  Kirkpatrick ................... 350/2

Primary Examiner—Hugh R. Chamblee
Attorney—Reif and Gregory

ABSTRACT: A housing embodying a lens system, the lenses of said system being comprised of components providing a clear window for a radiation on the order of 69.5 gHz. the lower of said lenses having a greater lens area and a greater focal length than the upper of said lenses to collect a wide spherical angle of said radiation to focus the same upon a detection plate carried by said housing for sensory detection of said radiation, and means carried by said housing for adjustably positioning said detection plate to focus said radiation thereon.

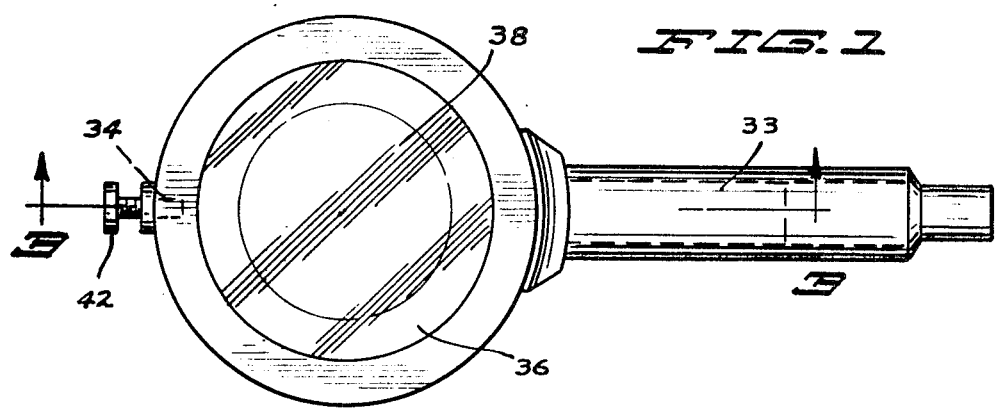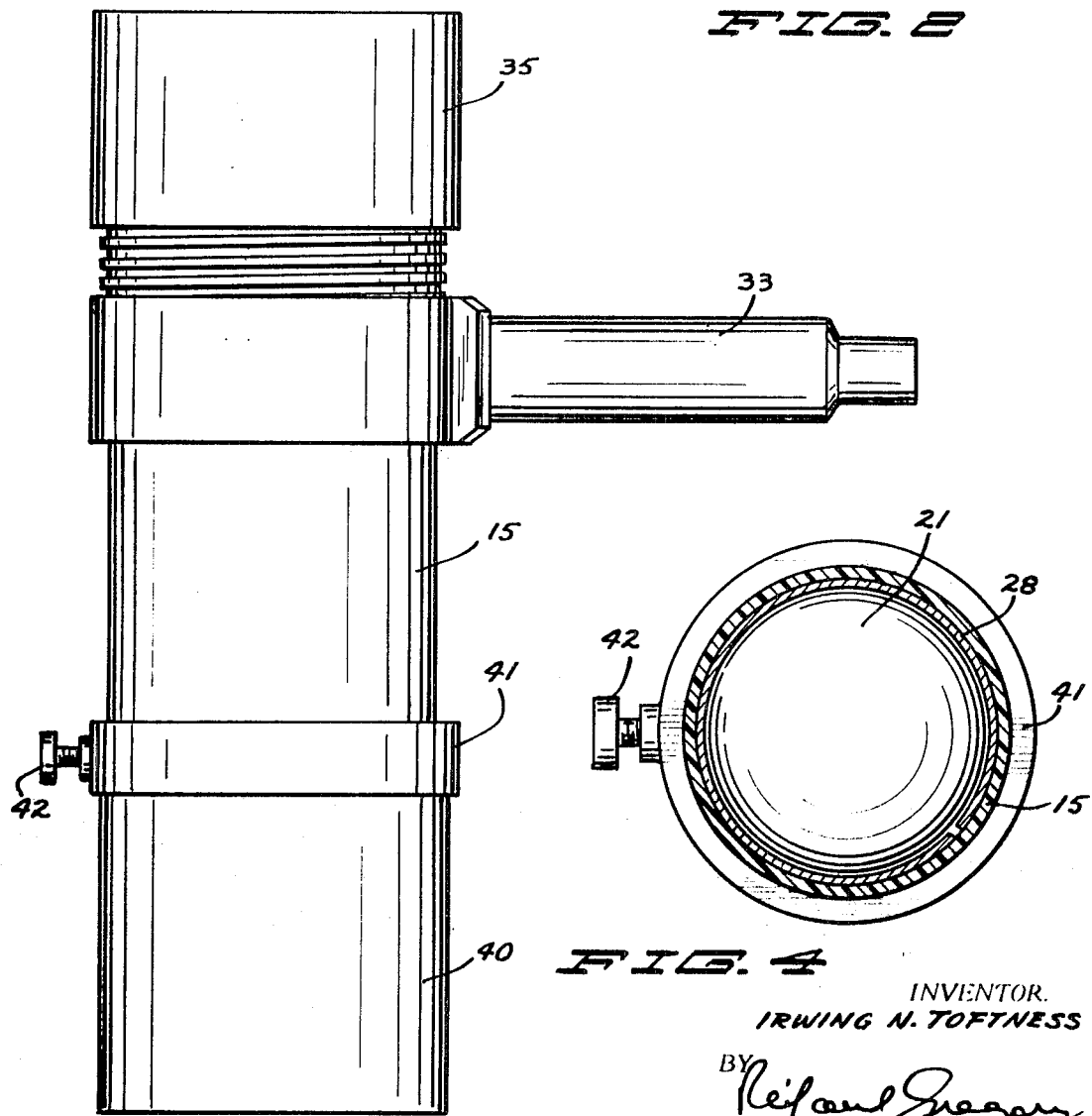

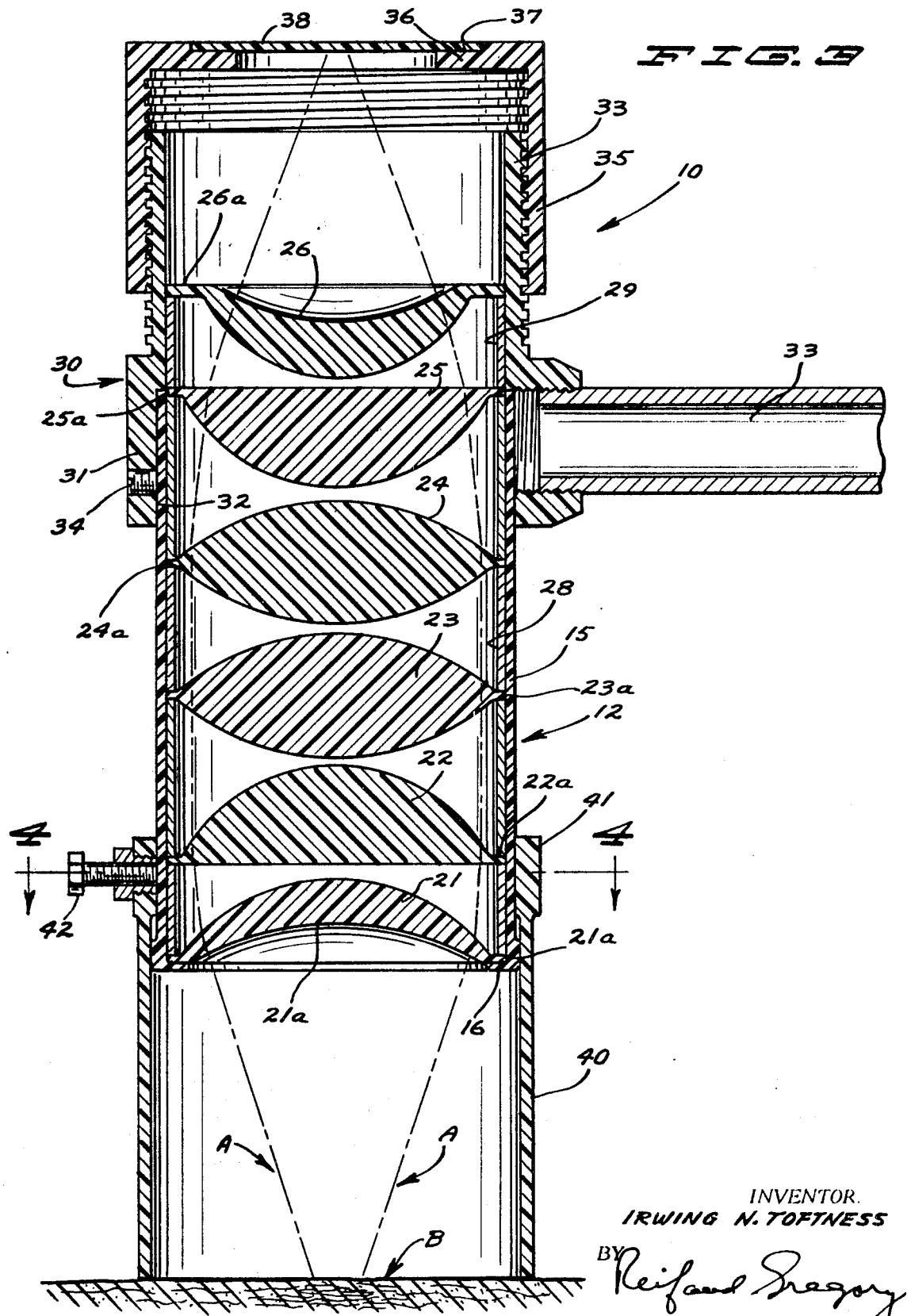

LENS RADIATION COLLECTING AND SENSING DEVICE

SUMMARY OF THE INVENTION

This invention relates to a device particularly adapted to detect and concentrate a certain frequency of radiation emanating from the human body. Areas in the spinal column have been found to emit a radiation which has been found by laboratory tests utilizing a radiometer to be on the order of 69.5 GHz. This frequency is well beyond the lower end of the infrared spectrum and is difficult of detection and not detectable by infrared methods. The areas appear to represent neurological disturbance or sources of body distress.

Magnetic devices and electrical devices have been used to detect areas of neurological disturbance in the spinal column. Such devices have been complex and not entirely satisfactory. The invention herein represents a greatly simplified and improved means for detecting such areas. This invention embodies the use of a readily handled lens system consisting of lenses having a clear window to pass a radiation on the order of 69.5 GHz. and which operate to collect a wide spherical angle of said radiation and concentrate and focus the same onto a detection plate upon which an operator may detect said radiation by sensory perception or in other words, by finger touch. Thus with the use of this invention, areas of neurological disturbance are readily detected. This invention provides for such a concentration of said radiation as to make detection possible of such low levels of radiation as might otherwise go undetected.

It is an object of the invention, therefore, to provide a lens system for sensory detection of a particular radiation emanating from the human body.

It is another object of this invention to provide a lens system comprising in combination, lenses having components to form a clear window for the transmission of a radiation on the order of 69.5 GHz.

It is a further object of this invention to provide a plurality of lenses arranged to collect a wide spherical angle of radiation of 69.5 GHz. and to focus the same onto a detection plate for sensory detection of said radiation.

These and other objects and advantages of the invention will be set forth in the following description made in connection with the accompanying drawings in which like reference characters refer to similar parts throughout the several views and in which:

FIG. 1 is a top plan view of the device herein:

FIG. 2 is a view in elevation

FIG. 3 is a view in horizontal section taken on line 3—3 of FIG. 1 as indicated; and FIG. 4 is a view in horizontal section taken on line 4—4 of FIG. 3 as indicated.

DESCRIPTION OF PREFERRED EMBODIMENT

Referring to the drawings, the device comprising the subject matter of the invention herein is indicated generally by the reference numeral 10.

Said device is shown consisting of a cylindrical housing 12 which may be formed as of suitable plastic material. Said housing comprises a main body portion 15.

Disposed within said main body portion are a plurality of lenses 21–26. The lenses 21 and 26 are concavo-convex, having their concave surfaces outwardly or oppositely disposed. The lenses 22 and 25 are plano–convex having their convex surfaces in facing relation. The central lenses 23 and 24 are convex. Said lenses respectively have annular rim or flange portions 21a–26a thereabout for support. The lower lens 21 is seated upon the inwardly extending portion of an annular flange 16 carried by and integral with the lower end portion of said body portion 15 and said flange projects at either side thereof. Said lenses are spaced apart by thin walled annular rings 28 and overlying the upper lens is shown a somewhat narrower annular ring 29. Said lenses will be further described.

Carried by said body portion 15 is a removable cylindrical portion 30 having an enlarged base portion 31 having an annular recess 32 to receive said body portion therein. A handle 33 projects outwardly of said extensible portion and threaded through said extensible portion as oppositely said handle is a recessed set screw 34 to engage said body portion 15. Said portion 30 has an upper externally threaded portion 33 and threaded thereonto is a cylindrical cap portion 35 which provides for linear extension or adjustment and said cap portion 35 has an annular inwardly extending flange 36 spaced downwardly of the upper end portion to form a recess 37 to receive and hold by a press fit, a circular plate member 38 which will be referred to hereafter as a detection plate.

A second extensible cylindrical portion 40 having a sliding fit about said body portion 15 is carried at the lower end thereof and is retained by the outwardly projecting portion of said flange 16. Said extensible portion 41 has a knurled set screw 42 threaded through said flange portion thereof to frictionally engage said body portion 15.

The purpose of the device herein is directed to the detection of a particular frequency of radiation, namely on the order of 69.5 GHz. This is a radiation of an extremely low level and is difficult of detection. A lens is required having components to provide a good coefficient of transmission or a clear window at said frequency. It has been found that a preferred material having the requisite components is a plastic material known commercially as No. 1422 Rexolite. Said detection plate 36 is also preferably formed of this material. A Rexolite lens as a result of tests made with a Dicke radiometer was found to have a coefficient of transmission of 98.5 percent per inch of material with respect to the frequency of 69.5 GHz. Lenses of Rexolite have a low refraction index to this radiation. For an 8 inch focal length of a hyperbolic lens, the index of refraction is given as 1.6.

The source of radiation may vary as to depth within the human body and a focal length up to 3 to 4 inches for detection may be required with respect to the bottom lens. One of the characteristics of the lenses used in providing a clear window at 69.5 GHz. is that the lenses used have a low-refractive index to the radiation. Hence a specific combination of lenses is required to refocus the radiation collected within the limits of the housing structure. A relatively large diameter is provided for the bottom lens and the lens next thereabove to permit the collection of a wide spherical angle of radiation at some distance from the source of radiation, such as at a distance up to 3 to 4 inches. The lenses are arranged to focus the radiation collected upon said detection plate through the uppermost lens particularly arranged to have a focal length substantially shorter than the focal length of the lens through which the radiation is first collected. A short focal length to said detection plate from the uppermost lens is desired in order to limit the operating length of said housing to a readily handled device. A focal length of 1½ to 2 inches is desirable from said uppermost lens to the detection plate with respect to a 3 to 4 inch focal length between the bottom lens and the source of radiation.

The concavity of the lens 21 and 26 will be designed in keeping with the focal lengths indicated. The intermediate lenses are designed to focus the radiation collected through the lens 26 and onto the detection plate 38.

The lenses 21 and 22 are suitably formed having larger lens areas than that of the uppermost lens to have a focal length and a capability of collecting a wide spherical angle of radiation at a relatively long focal length.

OPERATION

In operation, the device will be taken in hand by handle 33 to scan a body such as the spinal column thereof. By laboratory tests using elaborate equipment, it has been found that some areas of the body such as areas of neurological disturbance will emit a radiation of greater or lesser intensity of a frequency on the order of 69.5 GHz. The location of such areas by the use of this device is readily and accurately accomplished.

The device is held rather closely to the body such as to the spine thereof by one hand, and a finger of the other hand is used to sense the upper surface of the detection plate. The plate in being prepared for use, must be free of any foreign element and free from any film. It may be suitably cleaned as with the use of alcohol. The presence of radiation being collected and concentrated by the lenses of said device and focused upon said detection plate 38 is detected by finger touch upon said plate. The operator will physically sense the radiation. What is detected or sensed by the operator is a friction or dragging sensation which retards the passage of a finger or fingers over the surface of the deflection plate. The apparatus is in focus when the highest intensity of this sensation is felt. The lines A diagrammatically indicate the approximate boundary rays of the radiation collected and focused. B indicates a body surface.

For the optimum reception or sensing of the radiation, the detection plate 38 will be spaced from the lens 26 on the order of one-half the distance which the lens 21 is spaced from the source of radiation and linear adjustment is readily made by rotation of said cap portion 35. Preliminarily, the device will be moved to scan a body such as the spine thereof and will be positioned for optimum results by hovering the same somewhat upwardly and downwardly over areas at which radiation is detected to achieve the maximum degree of detection. When a precise location has been found, the lower extensible portion 40 may be lowered to engage the surface of the body for spacing and support of the device with respect to the body or said portion 40 may be in a freely sliding position and then secured when desired. It will be understood that the source of radiation is subsurface with respect to the surface of the body. The cap portion 35 carrying the detection plate will be readily adjusted by rotation with respect to the lens 26 for a desired focus of the detected radiation upon the detection plate. The threads of the threaded portions are shown to be rather coarse, hence the adjustment may be small and represent only a partial turn of said cap portion.

In actual practice, the device has been very successful and particularly in locating areas of radiation of such low magnitude as may otherwise be undetected.

It will of course be understood that various changes may be made in the form, details, arrangement and proportions of the parts without departing from the scope of the invention herein which, generally stated, consists in a device capable of carrying out the objects above set forth, in the parts and combination of parts disclosed.

What is claimed is:

1. A radiation collecting and concentrating device having in combination,
   a housing,
   a plurality of lenses in spaced superposed relation within said housing,
   means within said housing spacing said lens,
   a detection plate within said housing spaced above the uppermost of said lenses,
   the lowermost of said lenses being arranged and formed to collect a large spherical angle of radiation at a relatively long focal length,
   the uppermost of said lenses being arranged and formed to have a relatively short focal length,
   said lenses being formed and arranged to bring into focus with respect to said detection plate the radiation collected by said lowermost of said lenses,
   means carried by said housing focusing said detection plate with respect to the radiation passing therethrough or transmitted by said lenses within said housing, and
   said detection plate and said lenses forming a window for the transmission of a frequency on the order of 69.5 GHz.,
   whereby said detection plate is focused for detection by sensory perception of said frequency passing therethrough.

2. The structure set forth in claim 1, wherein,
   the lowermost of said lenses have a greater lens area than the uppermost of said lenses to collect a wide spherical angle of radiation at a relatively long focal length.

3. The structure set forth in claim 1 including extensible means carried by said housing to support the lowermost of said lenses at a desirable focal length with respect to radiation detected.

4. The structure set forth in claim 1, wherein said detection plate comprises a relatively flat plate member.

5. The structure set forth in claim 1, wherein said lowermost of said lenses is convex-concavo in form.

6. The structure set forth in claim 1 wherein said uppermost of said lenses has a length of diameter less than that of said lowermost of said lenses.

7. The structure set forth in claim 1, wherein said lowermost lens in convex-concavo form and said uppermost of said lenses is concavo-convex in form.

* * * * *